Sept. 29, 1936.  L. M. ELLIS  2,055,524
CAGE FOR BALL OR ROLLER BEARINGS
Filed Feb. 8, 1935  2 Sheets-Sheet 1
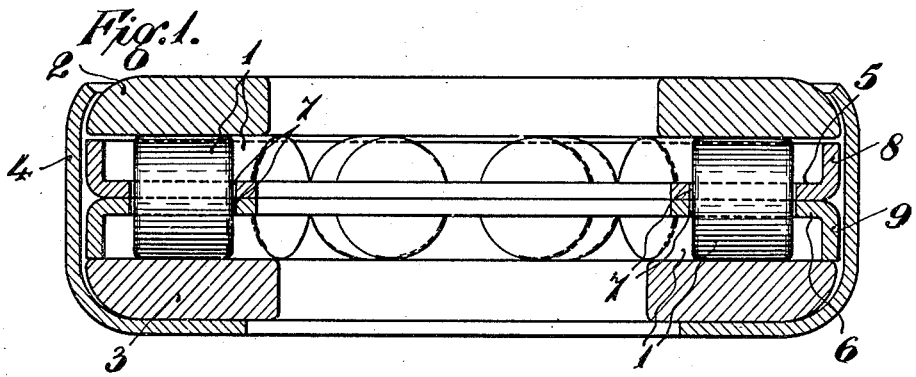
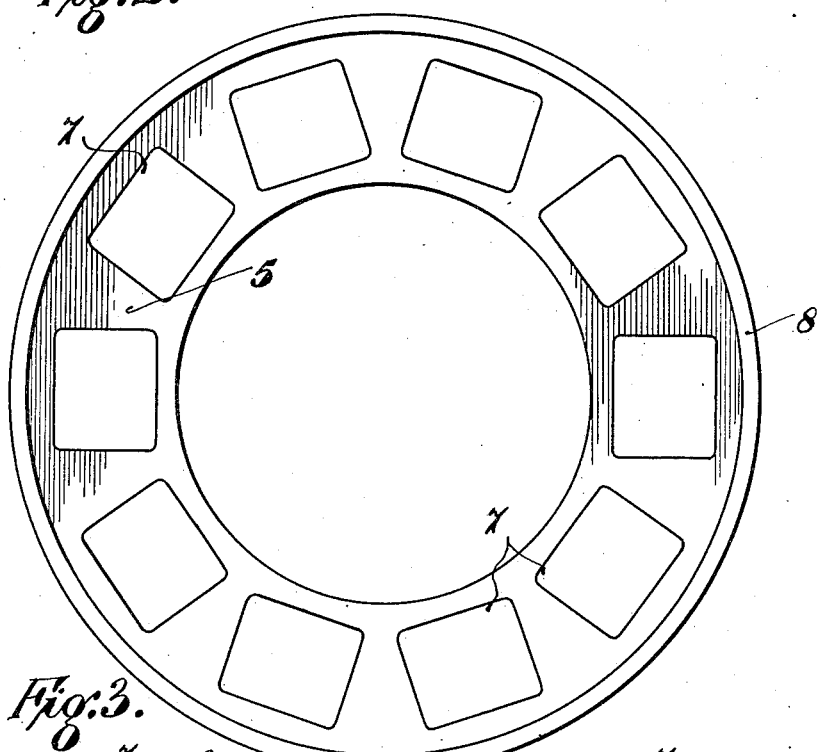
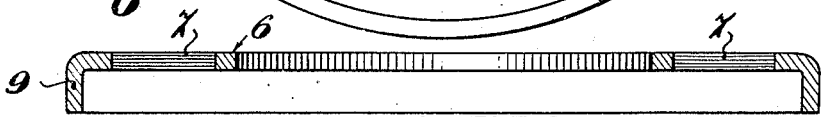
INVENTOR:
Llewellyn Milford Ellis,
By Carr, Kean & Gravely,
his Attorneys Sept. 29, 1936.  L. M. ELLIS  2,055,524
CAGE FOR BALL OR ROLLER BEARINGS
Filed Feb. 8, 1935  2 Sheets-Sheet 2

INVENTOR:
Llewellyn Milford Ellis,
By Carr and Carr Gravely,
his Attorneys

Patented Sept. 29, 1936

2,055,524

UNITED STATES PATENT OFFICE 2,055,524

CAGE FOR BALL OR ROLLER BEARINGS

Llewellyn Milford Ellis, Birmingham, England, assignor to The Timken Roller Bearing Company, Canton, Ohio, a corporation of Ohio Application February 8, 1935, Serial No. 5,516
In Great Britain February 12, 1934

5 Claims. (Cl. 308—235)

This invention relates to cages for ball and roller bearings, particularly thrust bearings, and the object of the invention is to provide a cage of an improved and efficient construction which may be cheaply manufactured.

According to this invention, the improved cage comprises a pair of rings superimposed or arranged face to face and having apertures to receive the balls or rollers, each ring being formed or provided at its outer edge with a laterally extending flange, the flanges of the two rings extending away from one another in opposite directions and being adapted to fit between the races of the bearing, so that one or other of the races may be engaged by one of the flanges and the two rings thereby maintained centrally or substantially centrally, relatively to the balls or rollers or maintained substantially mid-way between the races.

Figure 1 of the accompanying drawings is a sectional view of a thrust bearing having cylindrical rollers and fitted with a cage constructed in accordance with this invention.

Figure 2 is a plan view of the cage removed, showing the apertures for the rollers.

Figure 3 represents a cross-section through one of the two rings which form the cage.

Figure 4:
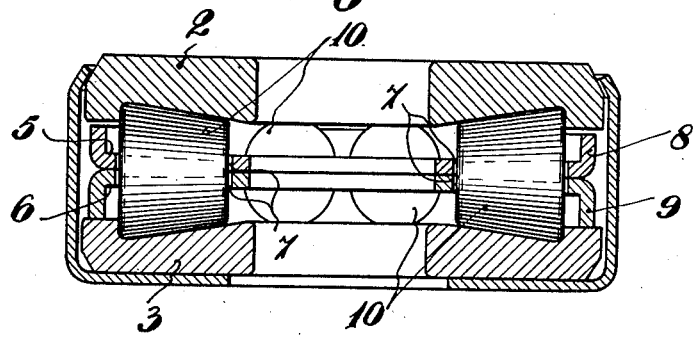
Figure 4 shows the invention applied to a bearing having tapered rollers, the cage being of substantially the same construction as that shown in the preceding figures.

Referring to Figures 1 to 3 of the drawings, the thrust bearing comprises a series of cylindrical rollers 1 arranged between upper and lower races 2 and 3, the upper race 2 being adapted to be fixed, for example, to a rotating vertical shaft, or other rotatable part, and the lower race 3, which is enclosed by an outer casing 4, being intended to be carried by a fixed support. The opposed faces of the two races 2 and 3 are flat, and the rollers 1 are arranged between these opposed faces so that their axes are disposed radially relatively to the centres of the races, the rollers being spaced peripherally around the latter and being maintained at equal distances apart by means of a cage. This cage consists, according to this invention, of two sheet metal rings 5 and 6 having large central openings for the shaft, and each formed with a series of peripherally-spaced rectangular apertures 7 for the rollers, each of the said apertures being of a size slightly larger than the axial sectional area of the engaging roller, so that it may fit easily over the widest portion of the same. These two rings 5 and 6, which form the cage, are of equal diameters and are superimposed, or arranged face to face, so that the roller apertures 7 in the two rings register or coincide; whilst formed integral with the outer edge of each ring is an annular flange, the ring 5 having a flange 8 and the ring 6 being formed with a flange 9. These two flanges 8 and 9 are similar in form, being each set at right-angles to the plane of the ring by which it is carried, but the said flanges are arranged to extend laterally in opposite directions, as shown, so that their outer edges are presented towards the respective races 2 and 3 of the bearing. The said outer edges of the flanges 8 and 9 are adapted to co-operate with the races for the purpose of maintaining the cage in position between the latter, in such a manner that the two rings 5 and 6 lie centrally relatively to the rollers 1, either flange being adapted to engage one of the races, according to the position of the bearing. Thus, in the arrangement illustrated in Figure 1 the flange 9 is shown resting on the lower race 3, so that the cage rings 5 and 6 are supported centrally in their correct positions, a slight clearance being left between the flange 8 and the upper race. If, on the other hand, the bearing is reversed the flange 8 would rest upon the race 2 and thus support the cage, and it will be obvious that the rings will be maintained centrally, or substantially centrally, in place, relatively to the rollers and race members, whatever be the position of the bearing. Also by providing flanges at the outer edges of the rings a maximum wearing surface is provided when the cage comes into contact with the casing 4.

The flanged rings for forming the cage may be pressed up from sheet metal blanks, or they may be formed in any other suitable manner; whilst, if desired, the two rings may be secured together, by welding or other means.

Figure 5:
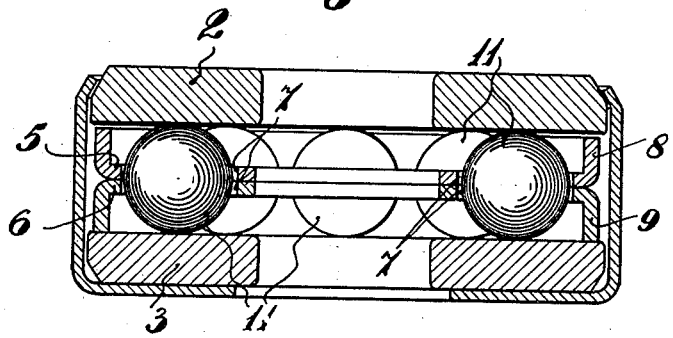
Figure 5 shows the application of the invention to a ball bearing.

In the arrangement illustrated in Figure 4, which shows the application of the invention to a taper roller bearing, the cage is of substantially the same construction as above described, consisting of two rings 5 and 6 with pressed-up flanges 8 and 9 extending in opposite directions towards the races 2 and 3, so that the rings are maintained centrally in place, the only difference being in the shape of the aligned apertures 7 in the rings, the said apertures being of a taper shape corresponding to the taper formation of the rollers 10. In the ball bearing shown in Figure 5, the cage is again of the same construction, comprising metal rings 5 and 6 having flanges 8 and 9 extending towards the top and bottom races 2 and 3 of the bearing; the apertures 7 in the two plates for receiving the balls 11, are, however, in this case, of a circular shape to fit over the largest portions of the balls.

Figure 6:
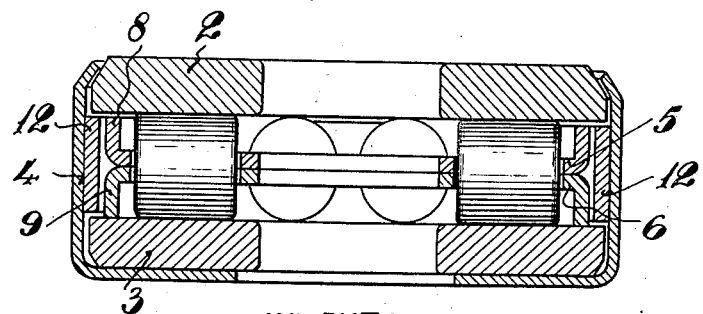
Figure 6 illustrates a slightly modified construction.

In the arrangement illustrated in Figure 6, the cage is of the same construction as above described, comprising two flanged rings 5 and 6 with laterally extending flanges 8 and 9, but fitted around the cage, between the flanges 8 and 9 of the latter and the cover or casing 4 housing the races 2 and 3 of the bearing, is a wearing ring 12. The object of this ring, which may be made of an anti-friction metal, such as brass or gun metal, or of hardened steel, is to prevent wear of the casing 4 owing to the rubbing action of the cage when being rotated.

Having fully described my invention, what I desire to claim and secure by Letters Patent is:—

1. A thrust bearing comprising opposed race members, rolling elements between said members, a cage for said rolling elements, said cage comprising two dished pressings arranged back to back with their outer edges extending towards the respective race members, a casing holding the race members together, and a wear ring between the peripheral portion of said casing and the peripheral portion of the cage.

2. An anti-friction bearing comprising opposed race members, anti-friction elements between the said race members, a cage for said anti-friction elements supported entirely by said race members, said cage comprising a pair of rings arranged face to face and having apertures to loosely receive the anti-friction elements, each ring being provided at its outer edge with a laterally-extending flange, the flanges of the two rings fitting between the race members and extending away from one another in opposite directions, so that the outer edge of each flange is opposed to a race member and may co-operate therewith to hold the cage substantially mid-way between the race members.

3. An anti-friction thrust bearing comprising opposed race members, anti-friction elements between the said race members, a cage for said anti-friction elements supported entirely by said race members, the said cage comprising a pair of one-piece rings arranged face to face in a plane radial to the axis of the bearing and having apertures to loosely receive the anti-friction elements, each ring being provided at its outer edge with a continuous and integral cage-centralizing flange disposed in the direction of the axis of the bearing, the flanges of the two rings engaging between the races and extending away from one another in opposite directions, so that the outer edge of each flange is opposed to a race member and may co-operate therewith to hold the cage substantially mid-way between the race members.

4. An anti-friction bearing comprising opposed race members, anti-friction elements between the said race members, a cage for said anti-friction elements supported entirely by said race members, said cage comprising a pair of one-piece rings secured together face to face and having plain unflanged apertures to loosely receive the anti-friction elements, each ring being provided at its outer edge with a continuous and integral cage-centralizing flange extending in the direction of the axis of the bearing, the flanges of the two rings being disposed between the races and extending away from one another in opposite directions, so that the outer edge of each flange is opposed to a race member and may co-operate therewith to hold the cage substantially mid-way between the race members.

5. A cage for an anti-friction bearing comprising two rings secured together face to face and having flanged outer edges extending in opposite directions for co-operation with the opposed faces of the respective races of the bearing, so that the edge of either flange may engage the adjacent race, according to the position of the bearing, to maintain the cage centrally in position, the said rings having registering apertures loosely to receive rolling bearing elements disposed between the races.

LLEWELLYN MILFORD ELLIS.